United States Patent [19]

von Stering-Krugheim

[11] 4,273,794

[45] Jun. 16, 1981

[54] COMPOSITION CONTAINING HONEY

[75] Inventor: Georg von Stering-Krugheim, Bendestorf, Fed. Rep. of Germany

[73] Assignee: E.R.E. Europe Representation Establishment, Vaduz, Liechtenstein

[21] Appl. No.: 81,329

[22] Filed: Oct. 3, 1979

[30] Foreign Application Priority Data

Oct. 19, 1978 [DE] Fed. Rep. of Germany ....... 2845570

[51] Int. Cl.$^3$ ............................ A23L 2/38; A23L 1/08
[52] U.S. Cl. ..................................... 426/590; 426/658
[58] Field of Search ................. 426/658, 72, 590, 271, 426/650; 127/38, 39

[56] References Cited

U.S. PATENT DOCUMENTS

| 482,738 | 9/1892 | Hechtman | 426/590 |
| 2,690,972 | 10/1954 | Bradshaw | 426/658 |
| 2,856,292 | 10/1958 | Kaloyereas | 426/658 |
| 3,958,017 | 5/1976 | Morse | 426/590 |
| 4,042,684 | 8/1977 | Kahm | 426/590 |

*Primary Examiner*—Jeanette M. Hunter
*Attorney, Agent, or Firm*—Toren, McGeady and Stanger

[57] ABSTRACT

A composition composed of honey with levorotatory ascorbic acid and citric acid. The composition contains the desirable properties of each of the ingredients but does not exhibit the excessive sweetness of honey. Beverages and spreads containing the composition are also disclosed.

9 Claims, No Drawings

COMPOSITION CONTAINING HONEY

BACKGROUND OF THE INVENTION

1. Field of the Invention

The invention relates to a composition containing honey and particularly to a spread for bread and a refreshing beverage.

2. Description of the Prior Art

Honey is the sweet material which is produced by bees who pick-up sweet juices, enrich them by materials from their own bodies, change them in their bodies, store them in honeycombs and allow them to ripen in the honeycombs.

Honey is predominantly used for direct human consumption and additionally, for the production of pastry, such as, gingerbread, and of sweets and alcoholic beverages. The importance of honey as a food stuff, savory snack and a medicine is primarily based on its content of easily absorbable carbohydrates, aromatic substances which stimulate the appetite, and mineral components. Of the latter, calcium, magnesium, iron, manganese, phosphorous, silicon, copper and nickel are present in almost all types of honey.

In medicine, honey serves as a strengthening substance for convalescents because of its high nutritional value. In slowly healing wounds, honey acts as an anti-inflammatory agent. Also, it is used in bronchial catarrh. Of special importance from a medical viewpoint is the presence in honey of acetylcholine, a material which, as a cholinergic factor, acts to lower the blood pressure, and has a stimulating effect on stomach and bowel activities. Its immediate effect on the heart is presumably based on the restoration of the heart muscle metabolism or a rebuilding of the energy reserves of the heart muscle. Furthermore, honey is used in the diet for liver conditions and particularly in chronic liver diseases.

Accordingly, honey is a valuable foodstuff, savory snack and remedy, and the increasing production numbers of honey in the last years show that the consumption of honey has constantly increased.

The composition of the honey varies, depending on the origin of the type of honey. However, generally, honey has a very high content of "sweet tasting sugars" particularly glucose and fructose. As a result, honey is frequently unacceptable to many people because it tastes too sweet to them. In many cases, honey is used as a spread for bread, i.e., together with other carbohydrates. This represents a further limitation on the consumption of honey since many people today, for health reasons, are on a decreased carbohydrate diet. On the other hand, the consumption of honey is important because of its above-described favorable properties.

SUMMARY OF THE INVENTION

We have discovered a composition containing honey which is distinguished by the fact that it has a different taste than honey, particularly, it does not taste as sweet as honey, but has a refreshing aroma. In accordance with the invention, a composition containing honey is provided which can be consumed in the form of a spread for bread, and enjoyed in the form of a refreshing beverage.

Surprisingly, we have found that a composition containing honey can be produced when levorotatory ascorbic acid and synthetic citric acid are added to the honey. This results in a composition containing honey which is an excellent spread for bread, but which simultaneously can be used as a concentrate for a refreshing beverage. If the composition is diluted with water, a fresh and pleasant tasting beverage is obtained which has a very specific characteristic taste.

More particularly, the composition of the present invention comprises honey admixed with from 0.8 to 2 g of levorotatory ascorbic acid and 15 to 50 g of citric acid per kilogram of honey. The composition containing honey in accordance with the present invention can further contain water, preferably up to 25% by weight.

DESCRIPTION OF THE PREFERRED EMBODIMENT

The composition containing honey in accordance with the invention may contain any type of honey. The food and drug laws of most European countries set certain minimum requirements for honey and all of those honey types which meet these minimum requirements can be used for the honey composition of the invention.

The water content of the composition depends on the intended end use of the honey composition and the type of honey used. If the composition is to be used as a spread for bread, the water content is determined by the original consistency of the honey. The honey composition according to the invention which is to be used as a spread for bread, usually contains water in amounts of less than 20% by weight, on the average 15 to 18% by weight and, a maximum of about 25%. If a honey which already contains 25% of water is used for the production of the present composition and it is to be used as a spread for bread, no more water need be added. If, however, the honey used as the initial material contains less than 20% of water, the additives are dissolved in an appropriate amount of water and are added to the honey so that the final concentration of the spread is a maximum of 25% by weight water.

If, on the other hand, the composition is to be used as a beverage for the production of the base material for a beverage, water is added to the composition in an amount to produce a pleasant tasting beverage with balanced properties. In the production of beverages, the beverages can be marketed as such, or the composition can be put on the market with any chosen water content, i.e., as a concentrate, so that the final beverage is prepared by the consumer. For example, for the preparation of a refreshing beverage, 1 kg of the composition containing 0.8 to 2 g levorotatory ascorbic acid and 15 to 20 g citric acid, the remainder being honey, can be diluted with 3 to 8 liters of water, preferably 4 to 6 l, and especially preferred 5 liters. Due to their high vitamin C content, such beverages are very beneficial.

Of course, the composition of the present invention may also contain conventional preservatives and other additives which are permitted by the food and drug laws.

As mentioned above, the spread for bread in accordance with the present invention has the significant advantage that it has a characteristic taste different from honey. The refreshing beverage according to the invention makes it possible to consume honey without having to simultaneously take in additional products which are rich in carbohydrates, such as, bread. It has the additional advantage that also those people who do not like to eat honey can now consume honey because the refereshing beverage according to the invention has a characteristic, slightly acidic taste.

The composition containing honey in accordance with the invention contains 0.8 to 2 g, and preferably 1 to 1.5 g, of levorotatory ascorbic accid, i.e., vitamin C. Vitamin C is commercially available by itself and is an important vitamin which is frequently used to prevent nutritional deficiencies and as a prevention against colds and is consumed in large amounts by the population. Vitamin C is usually given in the form of vitamin tablets. However, ingestion of the spread or beverage of the present invention, when taken regularly, negates the need for separate vitamin C doses.

Another component of the claimed composition is citric acid in an amount of 15 to 50 g, preferably 20 to 40 g, and most preferably, 25 to 30 g per kilogram of honey. Citric acid has an antirachitic effect because it facilitates the intake of calcium and it is additionally important in tissue respiration as a hydrogen carrier. The oral intake of citric acid is supposed to promote bone growth. Accordingly, the presence of citric acid in the present composition not only provides an acidic taste, but also, citric acid exhibits favorable nutritional effects.

Any type of citric acid which is commercially available can be used, such as, synthetic or natural citric acid. Under the food and drug laws, there are no limits with respect to the amounts of citric acid which can be added to effervescent lemonades, for taste improvement and for acidifying sweets, beverages, etc. In the composition according to the present invention, the content of citric acid is primarily determined by the taste.

While normal honey tastes sweet, the presence of the two acids, which usually cannot be tasted in the concentrations used, is intensified in the honey and a characteristic taste is obtained which is neither "sweet as honey" nor "sour as lemon". The base material tastes like honey with lemon in a pleasant balance without the sour or sweet nuances dominating.

The composition of the present invention is preferably produced by stirring ascorbic acid and citric acid into the honey. If necessary, this mixture can be slightly heated to better dissolve the ascorbic acid and the citric acid. However, one of the two components can first be dissolved in the honey, the other component can be dissolved in a small amount of water and then this solution is added to the honey. Finally, it is also possible to dissolve both components simultaneously or separately in small amounts of water and to then add these solutions to the honey. Severe restrictions with respect to the preparation process do not exist since both ascorbic acid and citric acid are usually dissolvable in water and dissolve in honey without difficulty. If necessary, the mixtures can be slightly heated to better dissolve the additives.

The following example explains the invention.

EXAMPLE 1 kg of Mexican honey (Yucatan) contains 1 g citric acid and 0.04 g ascorbic acid. 24 g of synthetic citric acid and 1.11 g of levorotatory ascorbic acid are added. The honey and the two acids are intimately mixed. As a result, the honey loses its overwhelming sweetness. In this manner, a composition containing honey is obtained which is very pleasant tasting and which is very beneficial to good health due to its high vitamin C content. In this form, it is to be used as a spread for bread.

40 g of the above-described composition containing honey diluted with 0.2 l water results in an extremely tasty, refreshing beverage which is very beneficial to good health.

What is claimed is:

1. A composition comprising honey, 0.8 to 2 g of levorotatory ascorbic acid and 15 to 50 g of citric acid per kilogram of honey.

2. The composition of claim 1 further comprising up to 25% by weight water.

3. A beverage comprising 1 kg of the composition of claim 1 and from 3 to 8 liters of water.

4. The composition of claim 2 wherein the amount of water is less than 20 percent by weight.

5. The composition of claim 2 wherein the amount of water is from 15 to 18 percent by weight.

6. The beverage of claim 3 wherein the amount of water is from 4 to 6 liters.

7. The composition of claim 1 wherein the amount of ascorbic acid is from 1 to 1.5 g per kilogram of honey.

8. The composition of claim 1 wherein the amount of citric acid is from 20 to 40 g per kilogram of honey.

9. The composition of claim 1 wherein the amount of citric acid is from 25 to 30 g per kilogram of honey.

* * * * *